(12) United States Patent
Matsuo et al.

(10) Patent No.: US 8,082,748 B2
(45) Date of Patent: Dec. 27, 2011

(54) WIND TURBINE GENERATOR

(75) Inventors: Takeshi Matsuo, Nagasaki (JP); Shinji Arinaga, Nagasaki (JP); Sadamu Takahashi, Hiroshima (JP); Takatoshi Matsushita, Nagasaki (JP); Masaaki Shibata, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 179 days.

(21) Appl. No.: 12/450,327

(22) PCT Filed: Jul. 8, 2009

(86) PCT No.: PCT/JP2009/062459
§ 371 (c)(1),
(2), (4) Date: Sep. 22, 2009

(87) PCT Pub. No.: WO2011/004472
PCT Pub. Date: Jan. 13, 2011

(65) Prior Publication Data
US 2011/0140418 A1    Jun. 16, 2011

(51) Int. Cl.
*F25B 27/00* (2006.01)
(52) U.S. Cl. ........................................ 62/236
(58) Field of Classification Search .......... 62/236, 62/230, 133, 160, 238.7, 324.1; 290/44, 290/55
See application file for complete search history.

(56) References Cited

U.S. PATENT DOCUMENTS

| | | | | |
|---|---|---|---|---|
| 3,752,395 A | * | 8/1973 | Ashikian | 237/46 |
| 4,143,522 A | * | 3/1979 | Hamrick et al. | 62/324.1 |
| 4,433,552 A | * | 2/1984 | Smith | 62/93 |
| 4,441,872 A | * | 4/1984 | Seale | 417/282 |
| 7,168,251 B1 | * | 1/2007 | Janssen | 60/641.1 |
| 2007/0024132 A1 | | 2/2007 | Salamah et al. | |

FOREIGN PATENT DOCUMENTS

JP    3949946    4/2007

* cited by examiner

*Primary Examiner* — Mohammad Ali
(74) *Attorney, Agent, or Firm* — Manabu Kanesaka; Kenneth M. Berner; Benjamin J. Hauptman (57) ABSTRACT

A wind turbine generator capable of preventing a salt damage and reducing noise as well as easily starting in a cold region is provided. The wind turbine generator includes a nacelle (3) for accommodating a generator set, an internal heat exchanging unit (13, 15, 16) accommodated in the nacelle (3) to exchange heat between the generator set and a refrigerant, an external heat exchanging unit (17) disposed outside the nacelle (3) to exchange heat between an outside air and the refrigerant, a compressor (18) disposed in the nacelle (3) to compress the refrigerant and circulate the refrigerant between the internal heat exchanging unit (13, 15, 16) and the external heat exchanging unit (17), and an expansion unit (19) to expand the refrigerant compressed by the compressor (18).

6 Claims, 4 Drawing Sheets

WIND TURBINE GENERATOR

TECHNICAL FIELD

The present invention relates to a wind turbine generator.

BACKGROUND ART

As conventional means for converting wind power energy into thermal energy, wind power energy is converted into electric energy, the converted electric energy is converted into thermal energy through a heat pump (see PTL 1 and 2 for example).

For example, "a cooling system using a wind turbine and a heat pump" announced in 1987 is known as an apparatus for driving a heat pump. This system converts wind power energy into electric energy by means of a wind turbine, the electric energy is charged into a secondary battery, and a refrigeration cycle (the heat pump) is operated by a DC generator.

As an example of the combination of a wind turbine and a heat pump, there is known a system in which a heat pump (a refrigeration cycle) is disposed outside the wind turbine, mechanical energy obtained by the wind turbine is transmitted through a rotation shaft passing through a tower, a compressor of the heat pump is driven to convert the mechanical energy into thermal energy, as described in PTL 2.

CITATION LIST

Patent Literature

{PTL 1}
Specification of U.S. Patent Application No. 2007/0024132
{PTL 2}
The Publication of Japanese Patent No. 3949946

SUMMARY OF INVENTION

Technical Problem

However, a large wind turbine having several MW output is used as recent commercial wind turbine generators. In a case where such a large wind turbine and a heat pump are combined with each other, the following problems are caused.

Specifically, when the wind turbine is increased in size, the tower is increased in height (e.g., 50 m to 70 m). Therefore, there is a problem that a rotation shaft passing through the tower for transmitting power becomes long and heavy, and loss of mechanical energy converted from wind power energy is largely increased.

Further, a radiation amount of heat radiated from a machine disposed in a nacelle, e.g., a gear box, a main bearing, a transformer and a generator is several % of output of the wind turbine generator (e.g., 100 kW to 300 kW), but there is a problem that in Patent Citations referred to above, a cooling system for dealing with the heat is unclear.

Generally, the outside air is introduced into a nacelle through an air intake such as a louver provided in the nacelle, and devices in the nacelle are cooled by the introduced outside air. That is, using the cooling system, heat is dissipated to the outside air introduced from a cooler of the cooling system, and the outside air of which heat is absorbed is discharged outside of the nacelle.

When the wind turbine is disposed at sea or at seaside, however, since outside air containing salt is introduced into the nacelle, there is a problem that lifetime of a device in the nacelle is shortened by salt.

When the wind turbine generator is disposed near a house, there is caused a problem of noise from the cooling system, e.g., noise caused by rotation of a cooler fan. In addition, an application range of a large wind turbine generator is expanded to a cold region, but since there is no cooling system (heat pump) in the nacelle, there is a problem that the wind turbine generator cannot be applied to the cold region.

The present invention has been accomplished to solve the above problems, and it is an object of the present invention to provide a wind turbine generator capable of preventing salt damage, capable of reducing noise, and capable of easily starting in the cold region.

Solution to Problem

To achieve the above object, the present invention provides the following solutions.

According to an aspect of the present invention, a wind turbine generator includes: a nacelle for accommodating a generator set; an internal heat exchanging unit accommodated in the nacelle to exchange heat between the generator set and refrigerant; an external heat exchanging unit disposed outside the nacelle to exchange heat between outside air and the refrigerant; a compressor disposed in the nacelle to compress the refrigerant and circulate the refrigerant between the internal heat exchanging unit and the external heat exchanging unit; and an expansion unit to expand a pressure of the refrigerant compressed by the compressor.

According to this aspect, for example, a refrigerant is circulated from a compressor through an external heat exchanging unit, an expansion unit, an internal heat exchanging unit, and the compressor in this order so as to constitute a refrigeration cycle. With this, heat generated in a device disposed in the nacelle, e.g., generated in a generator set can be radiated outside of the nacelle via the refrigerant. That is, heat of a device in the nacelle can sufficiently be radiated outside the nacelle even if the nacelle is not provided with an opening through which the outside air is introduced into the nacelle. Thus, it is possible to prevent the outside air including salt from flowing into the nacelle. Further, noise generated from the device in the nacelle does not leak outside of the nacelle.

If a refrigerant is circulated in a direction opposite from that described above, i.e., from the compressor through the internal heat exchanging unit, the expansion unit, the external heat exchanging unit and the compressor in this order so as to constitute a heat pump cycle, the device in the nacelle can be heated. When a wind turbine generator is started when the outside air is cold, even if it is necessary to heat a lubricant such as oil used for the device in the nacelle to lower its viscosity, it is possible to easily heat the lubricant such as oil.

In the above aspect, preferably, there is further included a wind turbine to supply a rotation driving force to the generator set using wind power, wherein the compressor is driven by the rotation driving force supplied by the wind turbine.

According to this structure, the compressor is driven using a rotation driving force supplied by branching the wind turbine energy. Therefore, a heat exchanging ability in the internal heat exchanging unit, i.e., a cooling ability of the generator set is changed in accordance with the number of revolutions of the wind turbine or the rotation torque. In other words, the cooling ability of the generator set is automatically controlled by the rotation driving force supplied from the wind turbine.

For example, if the rotation driving force supplied to the compressor is increased, a mass flow rate of a refrigerant discharged in the compressor is increased. Thus, the heat exchanging ability in the internal heat exchanging unit is enhanced, and the cooling ability of the generator set is automatically controlled such that the ability is enhanced.

In the above aspect, preferably, there is further included a motor to rotate and drive the compressor.

According to this structure, for example, by driving the compressor using electricity generated by the generator set, the heat exchanging ability in the internal heat exchanging unit, i.e., the cooling ability of the generator set is changed in accordance with the output of the wind, turbine generator. In other words, the cooling ability of the generator set is automatically controlled by the electricity supplied by the generator set.

For example, if the electricity supplied to the compressor is increased, a mass flow rate of a refrigerant discharged in the compressor is increased. Thus, the heat exchanging ability in the internal heat exchanging unit is enhanced, and the cooling ability of the generator set is automatically controlled such that the ability is enhanced.

In the above aspect, preferably, the external heat exchanging unit is provided with a heater to supply heat to the refrigerant.

According to this structure, when refrigerant is evaporated using the external heat exchanging unit as an evaporator, even when the outside air temperature outside the nacelle is low, the refrigerant can easily be evaporated by heating the refrigerant using a heater. Further, heat can be supplied to the main body of the external heat exchanging unit and a piping system to the external heat exchanger. When it is necessary to heat lubricant such as oil used for the generator set to lower its viscosity, it is possible to easily heat the lubricant such as oil.

Advantageous Effects of Invention

According to the wind turbine generator of the present invention, by circulating a refrigerant from the compressor through the external heat exchanging unit, the expansion unit, the internal heat exchanging unit and the compressor in this order so as to constitute a refrigeration cycle, without an opening in the nacelle, heat of a device in the nacelle can sufficiently be radiated outside of the nacelle. Therefore, there is an effect that salt damage and noise can be reduced. Further, by circulating a refrigerant from the compressor through the internal heat exchanging unit, the expansion unit, the external heat exchanging unit and the compressor in this order so as to constitute a heat pump cycle, a device in the nacelle can be heated. Therefore, there is an effect that a wind turbine generator can easily be started in a cold region.

DESCRIPTION OF EMBODIMENTS

First Embodiment

A wind turbine generator according to a first embodiment of the present invention will be explained with reference to FIGS. 1 to 3.

Figure 1:
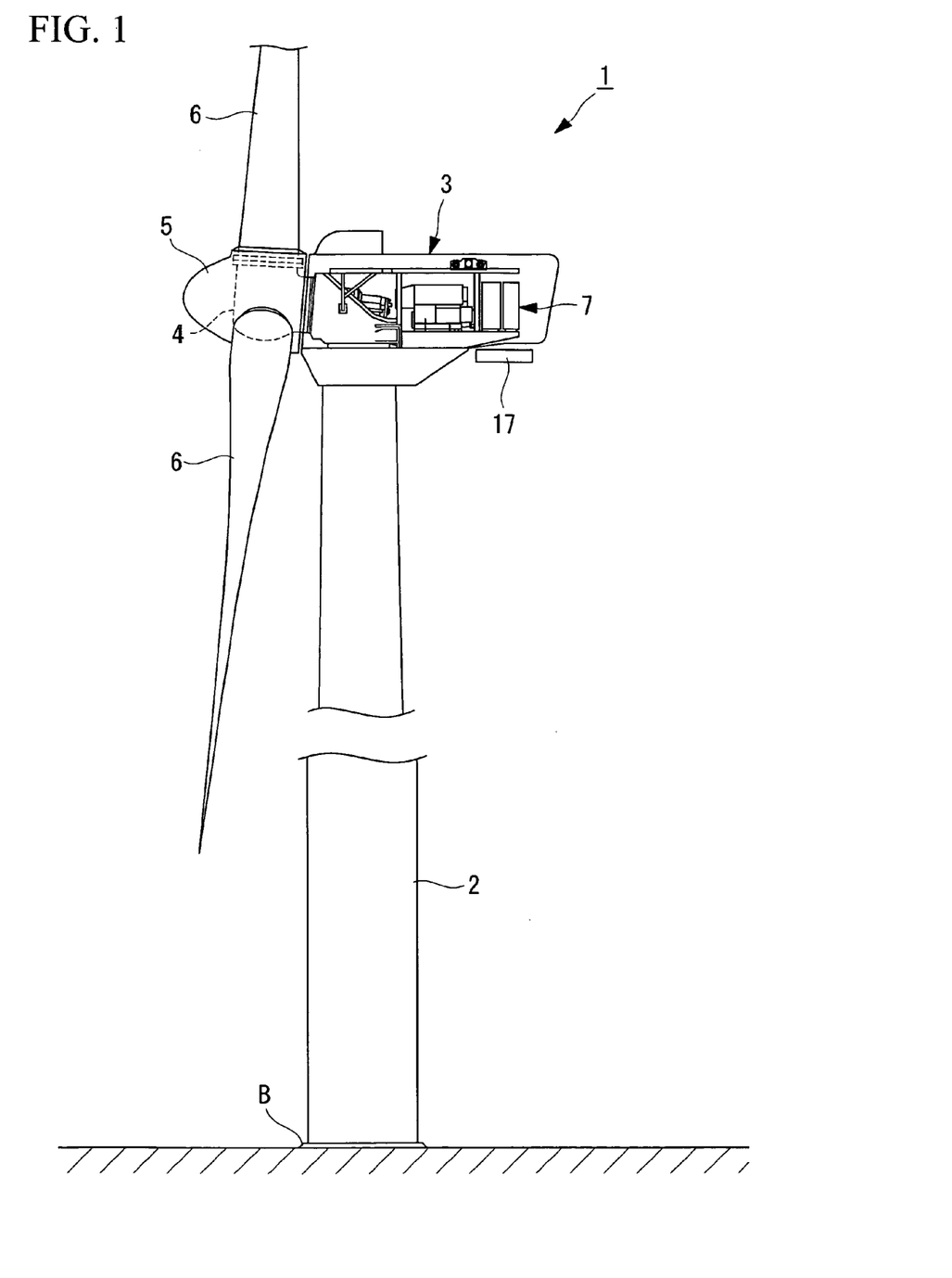
FIG. 1 is a general view for explaining a structure of a wind turbine generator according to a first embodiment of the present invention.

FIG. 1 is a general view for explaining a structure of the wind turbine generator according to the present embodiment.

A wind turbine generator 1 produces electricity using wind power.

As shown in FIG. 1, the wind turbine generator 1 includes a column (a tower) 2 standing on a base B, a nacelle 3 provided on an upper end of the column 2, a rotor head (wind turbine) 4 provided on the nacelle 3 such that the rotor head 4 can rotate around a substantially horizontal axis, a head capsule 5 covering the rotor head 4, a plurality of wind turbine rotor blades (the wind turbine) 6 radially mounted around a rotation axis of the rotor head 4, and a device in the nacelle (a generator set) 7 which generates electricity by rotating the rotor head 4.

Although three wind turbine rotor blades 6 are provided in the present embodiment of the invention, the number of the wind turbine rotor blades 6 is not limited to three, but the number may be two, four or more with no particular limitation.

As shown in FIG. 1, the column 2 extends upward from the base B (upward in FIG. 1), and a plurality of units is connected in the vertical direction or the like. The uppermost portion of the column 2 is provided with the nacelle 3. When the column 2 includes the plurality of units, the nacelle 3 is disposed on the uppermost unit.

As shown in FIG. 1, the nacelle 3 rotatably supports the rotor head 4, and the device 7 in the nacelle for generating electricity by rotating the rotor head 4 is accommodated in the nacelle 3.

The nacelle 3 is not provided with a venting opening (a louver) through which the outside air is introduced into the nacelle 3 from outside the nacelle 3, and the nacelle 3 is only provided with an opening for allowing a main shaft (not shown) for transmitting a rotation driving force of the rotor head 4 to pass through, and a doorway for maintenance.

As shown in FIG. 1, the plurality of wind turbine rotor blades 6, which radially extends, is mounted on the rotor head 4 around the rotation axis thereof, and the periphery, of the rotor head 4 is covered with the head capsule 5.

The rotor head 4 is provided with a pitch control unit (not shown) which rotates the wind turbine rotor blade 6 around an axis of the wind turbine rotor blade 6 to change a pitch angle of the wind turbine rotor blade 6.

In this structure, when a wind hits the wind turbine rotor blades 6 from a direction of the rotation axis of the rotor head 4, a force for rotating the rotor head 4 around its rotation axis is generated in the wind turbine rotor blades 6, and the rotor head 4 is rotated and driven.

Figure 2:
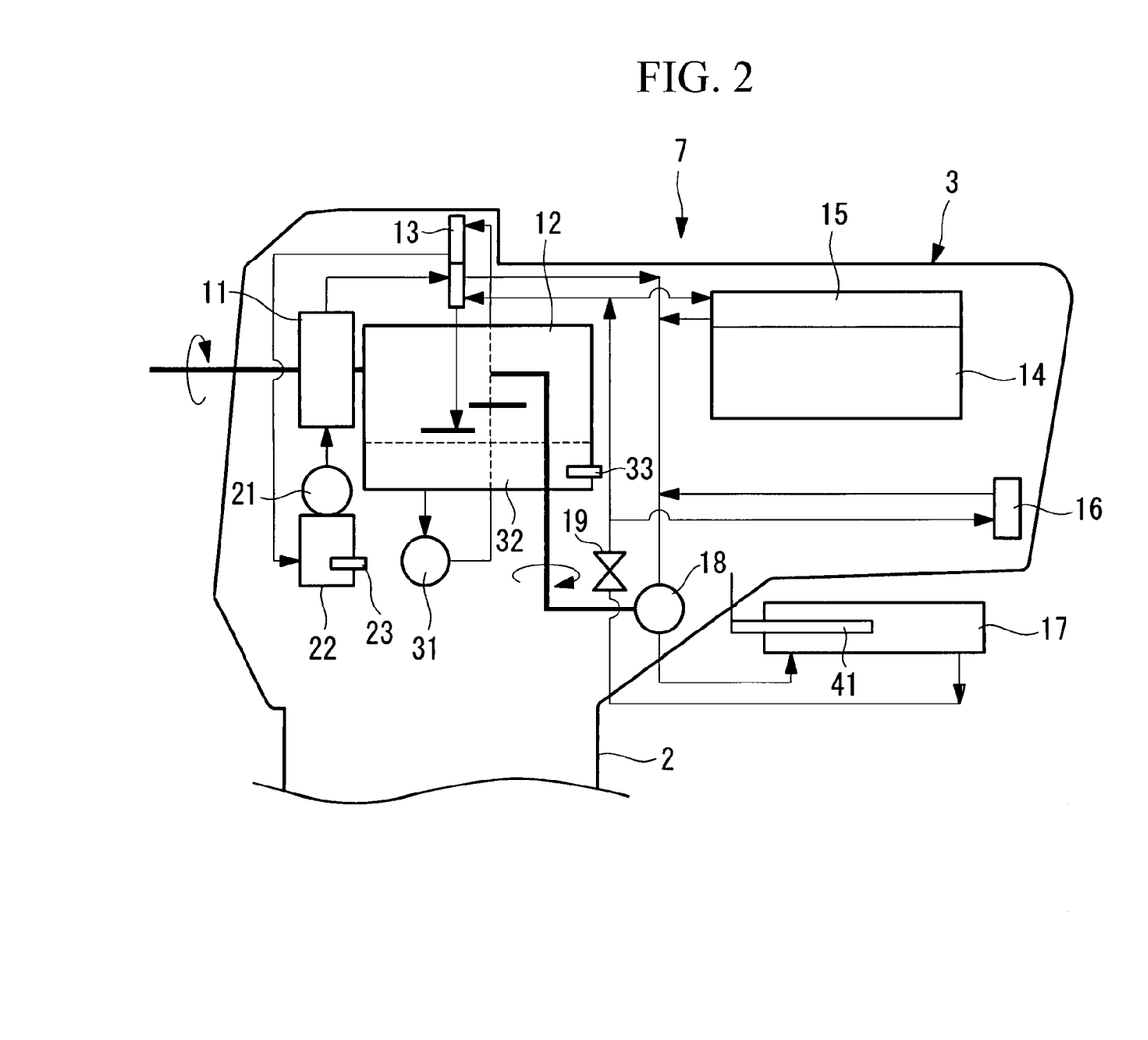
FIG. 2 is a schematic diagram for explaining a structure of an interior of a nacelle shown in FIG. 1.

FIG. 2 is a schematic diagram for explaining a structure of an interior of the nacelle shown in FIG. 1.

As shown in FIG. 2, a device 7 in the nacelle accommodated in the nacelle 3 is provided with a main bearing 11 which rotatably supports a main shaft (not shown). The main shaft transmits a mechanical rotation driving force of the rotor head 4 to a generator 14. The device 7 in the nacelle is also provided with a gear box (generator set) 12 which accelerates rotation of the rotor head 4 and transmits the rotation to the generator 14, an oil heat exchanging unit (internal heat exchanging unit) 13 which cools or heats oil used for lubricating the main bearing 11 and the gear box 12, the generator (generator set) 14 which generates electricity using the transmitted mechanical rotation driving force, a generator heat exchanging unit (internal heat exchanging unit) 15 which cools or heats the generator 14, and an inverter heat exchanging unit (internal heat exchanging unit) 16 which cools or heats an inverter. The inverter controls voltage and frequency of generated electricity. The device 7 in the nacelle is also provided with an external heat exchanging unit 17 which exchanges heat between a refrigerant and the outside air outside the nacelle 3, a compressor 18 which circulates a refrigerant between the oil heat exchanging unit 13, the generator heat exchanging unit 15, the inverter heat exchanging unit 16 and the external heat exchanging unit 17. The device 7 in the nacelle is also provided with an expansion valve (expansion unit) 19 which expands a pressure of a compressed refrigerant.

The main bearing 11 includes a bearing tank 22 and a bearing pump 21 which pumps lubricant oil (lubricant) for lubricating inside the main bearing 11. The bearing pump 21 and the bearing tank 22 constitute a circulation path for lubricant oil together with the main bearing 11 and the oil heat exchanging unit 13.

The main bearing tank 22 includes a main bearing heater (heater) 23 for heating lubricant oil stored therein.

The gear box 12 transmits a mechanical rotation driving force transmitted from the rotor head 4 to the generator 14 and to the compressor 18. The number of revolutions, i.e., the rotation speed of the rotation driving force transmitted to the generator 14 and the compressor 18 is increased.

The gear box 12 includes a gear box tank 32 and a gear box pump 31 which pumps lubricant oil for lubricating inside the gear box 12. The gear box pump 31 and the gear box tank 32 constitute a circulation path for lubricant oil together with the gear box 12 and the oil heat exchanging unit 13.

The gear box tank 32 is provided with a gear box heater (heater) 33 which heats lubricant oil stored therein.

The oil heat exchanging unit 13 is a heat exchanger into which lubricant oil that lubricated the main bearing 11 and the gear box 12 flows. The oil heat exchanging unit 13 exchanges heat between a refrigerant circulated by the compressor 18 and a lubricant oil.

In a state where a viscosity of the lubricant oil is sufficiently low and the wind turbine generator 1 is operated, the oil heat exchanging unit 13 is used as an evaporator and the lubricant oil radiates heat to the refrigerant.

On the other hand, when the wind turbine generator 1 is started when the outside air is cold and a viscosity of lubricant oil is high, the oil heat exchanging unit 13 is used as a condenser, and a refrigerant radiates heat to lubricant oil.

The oil heat exchanging unit 13 is connected such that a refrigerant which flowed out from the oil heat exchanging unit 13 flows into the compressor 18, the external heat exchanging unit 17, and the expansion valve 19 in this order in a state where a viscosity of lubricant oil is sufficiently low and the wind turbine generator 1 is operated, and a refrigerant passing through the expansion valve 19 again flows into the oil heat exchanging unit 13. By circulating the refrigerant in this manner, a refrigeration cycle is constituted.

The generator heat exchanging unit 15 is a heat exchanger disposed in adjacent to the generator 14, and radiates heat generated by the generator 14 to a refrigerant.

The generator heat exchanging unit 15 is connected such that a refrigerant which flowed out from the generator heat exchanging unit 15 flows into the compressor 18, the external heat exchanging unit 17, and the expansion valve 19 in this order in a state where the wind turbine generator 1 is operated, and a refrigerant passing through the expansion valve 19 again flows into the generator heat exchanging unit 15. By circulating a refrigerant in this manner, a refrigeration cycle is constituted.

The inverter heat exchanging unit 16 is a heat exchanger disposed behind the nacelle 3, and radiates heat generated by an inverter (not shown) to a refrigerant.

The inverter heat exchanging unit 16 is connected such that a refrigerant which flowed out from the inverter heat exchanging unit 16 flows into the compressor 18 and the external heat exchanging unit 17 in this order in a state where the wind turbine generator 1 is operated, and a refrigerant passing through the expansion valve 19 again flows into the inverter heat exchanging unit 16. By circulating a refrigerant in this manner, a refrigeration cycle is constituted.

The external heat exchanging unit 17 exchanges heat between a refrigerant and the outside air, and is disposed on a lower surface behind the nacelle 3.

The external heat exchanging unit 17 is connected such that a refrigerant which flowed out from the external heat exchanging unit 17 flows into the expansion valve 19, any of the oil heat exchanging unit 13, the generator heat exchanging unit 15, and the inverter heat exchanging unit 16, and the compressor 18 in this order in a state where the wind turbine generator 1 is operated, and a refrigerant which is discharged from the compressor 18 again flows into the external heat exchanging unit 17. By circulating a refrigerant in this manner, a refrigeration cycle is constituted.

The external heat exchanging unit 17 is provided with an external heat exchanging heater (heater) 41 which heats lubricant oil stored in a main body of the external heat exchanging unit 17 or in a piping system connected to the external heat exchanging unit 17. It is preferable to provide a shower (not shown) for washing off salt adhered to the external heat exchanging unit 17 to prevent the external heat exchanging unit 17 from being corroded by salt of the external heat exchanging unit 17.

In the case of a refrigeration cycle which absorbs heat of a refrigerant in the oil heat exchanging unit 13, the compressor 18 compresses a refrigerant and discharges the refrigerant into the external heat exchanging unit 17. In the case of a heat pump cycle which supplies heat to a refrigerant in the oil heat exchanging unit 13, the compressor 18, compresses a refrigerant and discharges the refrigerant toward the oil heat exchanging unit 13, the generator heat exchanging unit 15, and the inverter heat exchanging unit 16.

A mechanical rotation driving force is transmitted to the compressor 18 from the rotor head 4 through the gear box 12, and the compressor 18 compresses a refrigerant by the transmitted mechanical rotation driving force. In the present embodiment, the compressor 18 switches a discharging direction of a refrigerant. That is, the compressor 18 discharges a refrigerant to the external heat exchanging unit 17 in the case of a refrigeration cycle, and the compressor 18 discharges a refrigerant to the oil heat exchanging unit 13, the generator heat exchanging unit 15, and the inverter heat exchanging unit 16 in the case of a heat pump cycle.

A compressor capable of switching a discharging direction of a refrigerant may be used as described above, or a compressor which discharges a refrigerant only in one direction, and a three-way valve or a four-way valve which controls a flowing direction of a refrigerant may be used, and this is not especially limited.

An outline of an electricity generating method in the wind turbine generator 1 having the above-described structure will be explained.

In the wind turbine generator 1, wind power energy which hits the wind turbine rotor blade 6 from a rotation axial direction of the rotor head 4 is converted into mechanical energy which rotates the rotor head 4 around the rotation axis.

Rotation of the rotor head 4 is transmitted to the device 7 in the nacelle. In the device 7 in the nacelle, electricity, e.g., AC electricity having frequency of 50 Hz or 60 Hz suitable for a subject to which electricity is supplied is generated.

At least while electricity is generated, in order to effectively apply wind power energy to the wind turbine rotor blade, the nacelle 3 is appropriately rotated on a horizontal plane, thereby controlling the rotor head 4 such that it is oriented to an upstream direction of wind.

Next, as the feature of the present embodiment, the heat exchanging operation in the oil heat exchanging unit 13, the generator heat exchanging unit 15, the inverter heat exchanging unit 16 and the external heat exchanging unit 17 will be explained.

When electricity is generated in the wind turbine generator 1, to constitute a refrigeration cycle as shown in FIG. 2, the oil heat exchanging unit 13, the generator heat exchanging unit 15 and the inverter heat exchanging unit 16 act as a cooler (evaporator). That is, a refrigerant absorbs heat in the oil heat exchanging unit 13 and the like and evaporates the refrigerant. The external heat exchanging unit 17 acts as a condenser, and a refrigerant radiates heat to the outside air and is condensed.

More specifically, a refrigerant is compressed to have a high temperature and high pressure by the compressor 18 to which a mechanical rotation driving force of the rotor head 4 is transmitted through the gear box 12, and the refrigerant is discharged toward the external heat exchanging unit 17. The refrigerant which flowed into the external heat exchanging unit 17 radiates heat to the outside air in the external heat exchanging unit 17 and is condensed. The condensed and liquefied refrigerant flows into the expansion valve 19 and is expanded when the refrigerant passes through the expansion valve 19. The expanded refrigerant flows into the oil heat exchanging unit 13, the generator heat exchanging unit 15, and the inverter heat exchanging unit 16.

The refrigerant which flowed into the oil heat exchanging unit 13 lubricates the main bearing 11 and the gear box 12 in the oil heat exchanging unit 13, the refrigerant absorbs heat from the high temperature lubricant oil and is evaporated. The evaporated refrigerant flows out from the oil heat exchanging unit 13, flows into the compressor 18, and is compressed again.

Lubricant oil for main bearing of which heat is removed and which is cooled is circulated through the bearing tank 22, the bearing pump 21, and the main bearing 11 in this order and again flows into the oil heat exchanging unit 13. Lubricant oil for the gear box is circulated through the gear box 12, the gear box tank 32, and the gear box pump 31 in this order and again flows into the oil heat exchanging unit 13.

The refrigerant which flows into the generator heat exchanging unit 15 absorbs heat generated from the generator 14 in the generator heat exchanging unit 15 and is evaporated. The evaporated refrigerant flows out from the generator heat exchanging unit 15, flows into the compressor 18, and is again compressed.

The refrigerant which flows into the inverter heat exchanging unit 16 absorbs heat generated from the inverter 14 in the inverter heat exchanging unit 16 and is evaporated. The evaporated refrigerant flows out from the inverter heat exchanging unit 16, flows into the compressor 18 and is again compressed.

Figure 3:
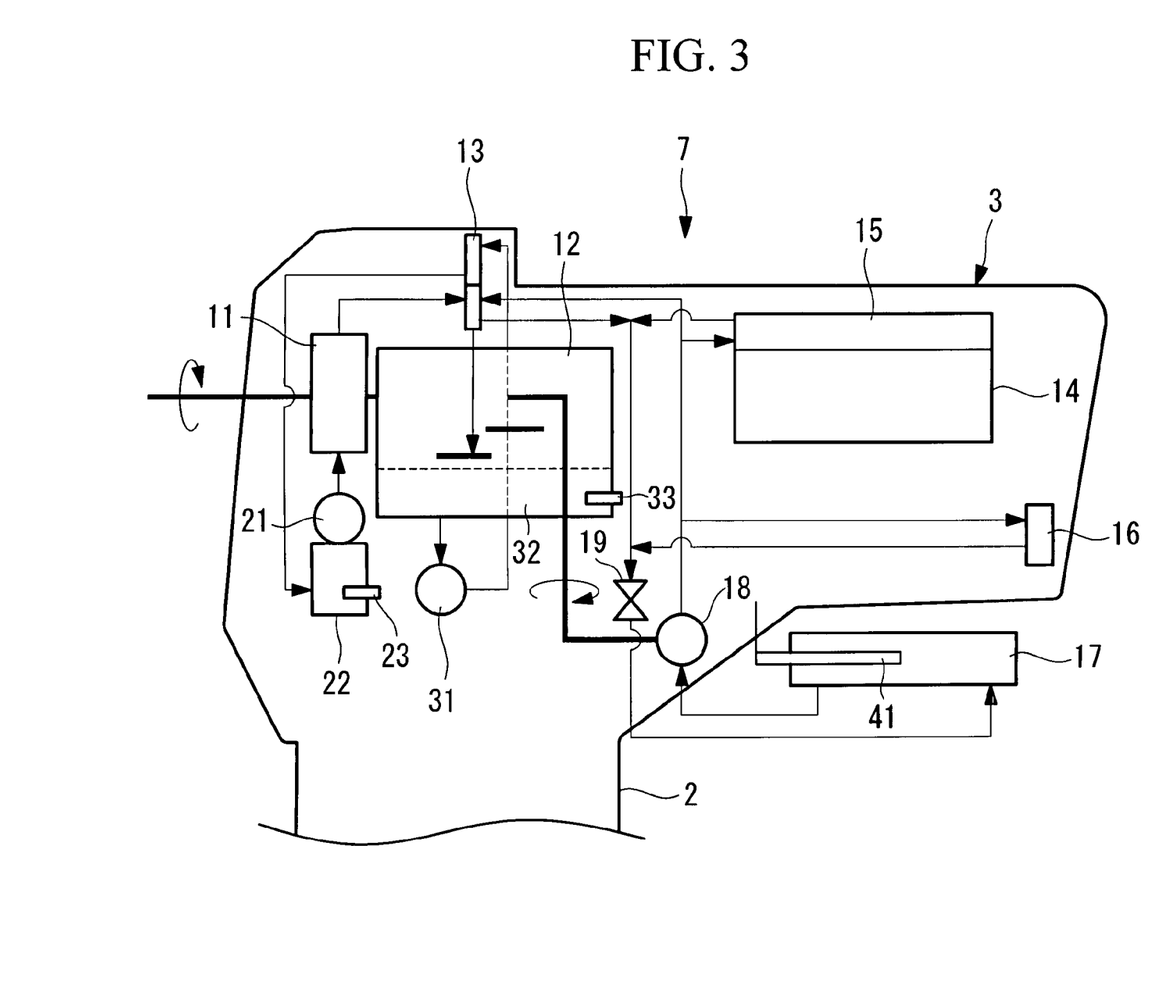
FIG. 3 is a schematic diagram for explaining a flow of a refrigerant when the wind turbine generator shown in FIG. 2 is started from a cold state.

FIG. 3 is a schematic diagram for explaining a refrigerant flow when the wind turbine generator shown in FIG. 2 is started from its cold state.

When the wind turbine generator 1 is started under such an environment in which the outside air temperature is, for example, −30° to −40°, i.e., when the wind turbine generator 1 is started in a state where a viscosity coefficient of lubricant oil which lubricates the main bearing 11 and the gear box 12 is as high as a few ten thousand cSt and lubrication ability cannot be expected, a circulation direction of a refrigerant is set to a direction opposite from that shown in FIG. 2, i.e., a refrigerant is allowed to flow so as to constitute a heat pump cycle instead of a refrigeration cycle, and lubricant oil is heated.

More specifically, a refrigerant compressed by the compressor 18 to have a high temperature and high pressure is discharged toward the oil heat exchanging unit 13, the generator heat exchanging unit 15, and the inverter heat exchanging unit 16.

The high temperature and high pressure refrigerant which flowed into the oil heat exchanging unit 13 discharges heat to lubricant oil which lubricates the main bearing 11 and the gear box 12 and is condensed. The condensed refrigerant flows out from the oil heat exchanging unit 13 and flows into the expansion valve 19.

Lubricant oil which absorbs heat discharged from the refrigerant and which is heated is lowered in viscosity to such a level that lubricating ability can be expected. The lubricant oil flows out from the oil heat exchanging unit 13 and then, the lubricant oil is supplied to the main bearing 11 and the gear box 12 and used for lubrication.

As described above, only heat of a refrigerant may be used and the lubricant oil may be heated, or the bearing heater 23 may further be used to heat the lubricant oil, or the gear box heater 33 may further be used to heat the lubricant oil. The heating method of lubricant oil is not especially limited to heating from a refrigerant.

A refrigerant flows into the expansion valve 19 from the oil heat exchanging unit 13, the generator heat exchanging unit 15, and the inverter heat exchanging unit 16, and when the refrigerant passes through the expansion valve 19, the refrigerant is expanded. The expanded refrigerant flows into the external heat exchanging unit 17.

An external heat exchanging heater 41 is disposed in a main body of the external heat exchanging unit 17 or in a piping system connected to the external heat exchanging unit 17. A refrigerant heated by the external heat exchanging heater 41 is evaporated, and the evaporated refrigerant flows into the compressor 18 and is again compressed.

As described above, a refrigerant may be evaporated by the main body of the external heat exchanging unit 17 or the external heat exchanging heater 41 disposed on the piping system connected to the external heat exchanging unit 17, or a refrigerant may be evaporated by an other heating device (not shown). The evaporating device of a refrigerant is not especially limited.

According to the above structure, for example, in a generator system of the wind turbine generator 1 disposed on the ocean, if a refrigerant is circulated from the compressor 18 through the external heat exchanging unit 17, the expansion valve 19, the generator heat exchanging unit 15 and the like and again the compressor 18 in this order, heat generated in the generator 14 can be radiated outside the nacelle 3 through the refrigerant. That is, it is possible to sufficiently radiate heat of the generator set outside the nacelle 3 without directly introducing the outside air including salt into the nacelle 3 from outside the nacelle 3, and it is possible to prevent lifetime of the wind turbine generator 1 from being shortened. As well as the generator 14, this effect can be expected also in the device 7 in the nacelle such as the main bearing 11, the gear box 12 and the inverter.

Further, since noise generated from the generator 14 and a cooler fan of the gear box 12 is enclosed in the nacelle 3, it is possible to prevent noise from leaking outside of the wind turbine generator 1.

If a refrigerant is circulated from the compressor 18 through the oil heat exchanging unit 13, the expansion valve 19, and the external heat exchanging unit 17, and again the compressor 18 this order to constitute a heat pump cycle, oil in the gear box 12 and the main bearing 11 can be heated. For example, when the wind turbine generator 1 is started in a state where the outside air temperature is as cold as −30° to −40°, even if it is necessary to heat lubricant oil used for the gear box 12 and the main bearing 11 and to lower the viscosity of the lubricant oil to such a level that lubricating ability can be expected, it is possible to easily heat the lubricant oil and easily start the wind turbine generator 1.

If a refrigerant is heated using the main body of the external heat exchanging unit 17 or the external heat exchanging heater 41 disposed on the piping system connected to the external heat exchanging unit 17, it is possible to easily evaporate the refrigerant. Therefore, even when it is necessary to increase the temperature of lubricant oil used for the gear box 12 or the main bearing 11 and to lower the viscosity of the lubricant oil to such a level that lubricating ability can be expected, it is possible to make it easier to start the wind turbine generator 1.

Since the compressor 18 is driven using a mechanical rotation driving force supplied by the rotor head 4, the heat exchanging ability in the oil heat exchanging unit 13, i.e., cooling ability of lubricant oil in the generator 14 or the gear box 12 is changed in accordance with the number of revolutions and the rotation torque of the rotor head 4. In other words, the cooling ability of the generator 14 or the gear box 12 is automatically controlled by the mechanical rotation driving force supplied by the wind turbine generator 1.

For example, when the rotation driving force supplied to the compressor 18 is increased, a mass flow rate of a refrigerant discharged in the compressor 18 is increased. Therefore, control is performed such that the heat exchanging ability in the oil heat exchanging unit 13 is enhanced and the cooling ability in the cooler of the generator 14 or the gear box 12 is enhanced.

Second Embodiment

Next, a second embodiment of the present invention will be explained with reference to FIG. 4.

The basic structure of the wind turbine generator of the present embodiment is the same as that of the first embodiment, but the driving method of the compressor is different from that of the first embodiment. Therefore, in the present embodiment, only the structure of the periphery of the compressor will be explained with reference to FIG. 4, and explanation of other structures will not be repeated.

Figure 4:
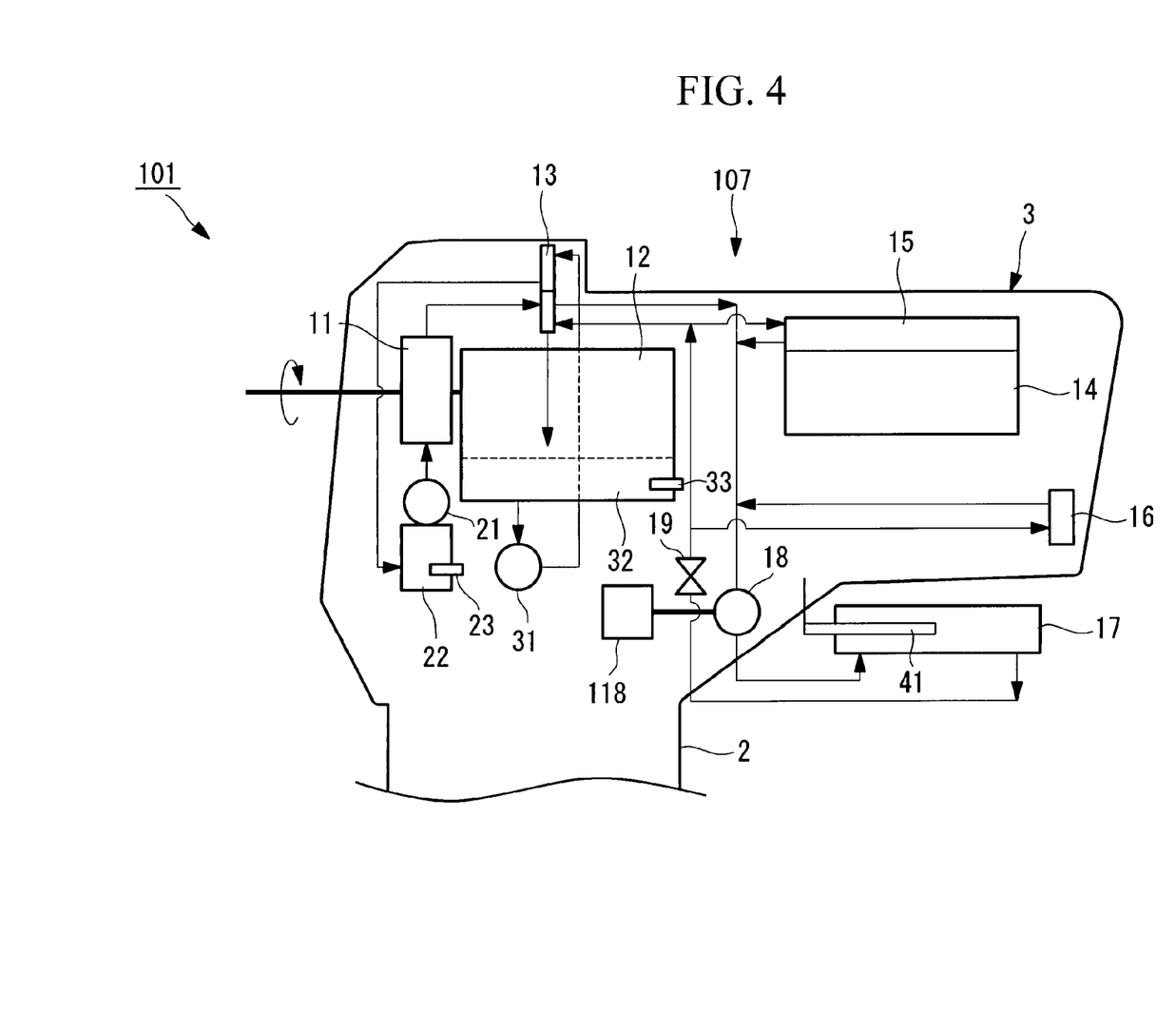
FIG. 4 is a schematic diagram for explaining a structure of a wind turbine generator according to a second embodiment of the present invention.

FIG. 4 is a schematic diagram for explaining the structure of the wind turbine generator according to the present embodiment.

The same constituent elements as those of the first embodiment are designated with the same symbols, and explanation thereof will not be repeated.

As shown in FIG. 4, a generator set 107 accommodated in a nacelle 3 in a wind turbine generator 101 includes a main bearing 11, a gear box 12, an oil heat exchanging unit 13, a generator 14, a generator heat exchanging unit 15, an inverter heat exchanging unit 16, an external heat exchanging unit 17, a compressor 18, an expansion valve 19, and an electric motor (a motor) 118 which rotates and drives the compressor 18.

Electricity generated by the generator 14 is supplied to the electric motor 118, and the motor 118 rotates and drives the compressor 18 using the supplied electricity.

When electricity is generated in the wind turbine generator 101, the compressor 18 rotated and driven by the electric motor 118 discharges a refrigerant compressed to have a high temperature and high pressure toward the external heat exchanging unit 17. Since the operation thereafter is the same as that of the first embodiment, explanation thereof will not be repeated.

According to the above structure, since the compressor 18 is driven using electricity generated by the generator 14, the heat exchanging ability in the oil heat exchanging unit 13, i.e., cooling ability in a cooler of the generator 14 or the gear box 12, is changed in accordance with output of the wind turbine generator 101. In other words, the cooling ability of the cooler of the generator 14 or the gear box 12 can be automatically controlled by the electricity supplied from the generator 14.

For example, when supplied electricity is increased, a mass flow rate of a refrigerant discharged in the compressor 18 is increased. Therefore, control is performed such that the heat exchanging ability in the oil heat exchanging unit 13 is enhanced and the cooling ability in the cooler of the generator 14 or the gear box 12 is enhanced.

REFERENCE SIGNS LIST

1, 101: Wind turbine generator
3: Nacelle
4: Rotor head (Wind turbine)
6: Wind turbine rotor blade (Wind turbine)
7: Device in nacelle (Generator set)
12: Gear box (Generator set)
13: Oil heat exchanging unit (Internal heat exchanging unit)
14: Generator (Generator set)
15: Generator heat exchanging unit (Internal heat exchanging unit)
16: Inverter heat exchanging unit (Internal heat exchanging unit)
17: External heat exchanging unit
18: Compressor
19: Expansion valve (Decompression unit)
23: Bearing heater (Heater)
33: Gear box heater (Heater)
41: External heat exchanging heater (Heater)
118: Motor

The invention claimed is:

1. A wind turbine generator comprising:
a nacelle for accommodating a generator set;
an internal heat exchanging unit accommodated in the nacelle to exchange heat between the generator set and a refrigerant;
an external heat exchanging unit disposed outside the nacelle to exchange heat between outside air and the refrigerant;
a compressor disposed in the nacelle to compress the refrigerant and circulate the refrigerant between the internal heat exchanging unit and the external heat exchanging unit; and
an expansion unit to expand the refrigerant compressed by the compressor,
wherein
the compressor is capable of switching between a refrigeration cycle and a heat pump cycle by switching a discharge in direction of a refrigerant from the compressor,
the refrigeration cycle circulates the refrigerant discharged from the compressor through the external heat exchanging unit, the expansion unit, the internal heat exchanging unit, and the compressor in this order, and the heat pump cycle circulates the refrigerant discharged from the compressor through the internal heat exchanging unit, the expansion unit, the external heat exchanging unit, and the compressor in this order.

2. The wind turbine generator according to claim 1, further comprising a wind turbine to supply a rotation driving force to the generator set using wind power, wherein the compressor is driven by the rotation driving force supplied by the wind turbine.

3. The wind turbine generator according to claim 1, further comprising a motor to rotate and drive the compressor.

4. The wind turbine generator according to claim 1, wherein the external heat exchanging unit is provided with a heater to supply heat to the refrigerant.

5. The wind turbine generator according to claim 1, wherein the internal heat exchanging unit comprises a plurality of heat exchangers.

6. The wind turbine generator according to claim 5, wherein a first of the plurality of heat exchangers comprises an oil heat exchanger, a second of the heat exchangers comprises a generator heat exchanger, and a third heat exchanger comprise an inverter heat exchanger, the first second and third heat exchangers being associated with an oil heat exchanger, a generator and an inverter which comprise components disposed within the nacelle.

* * * * *